United States Patent Office
3,196,103
Patented July 20, 1965

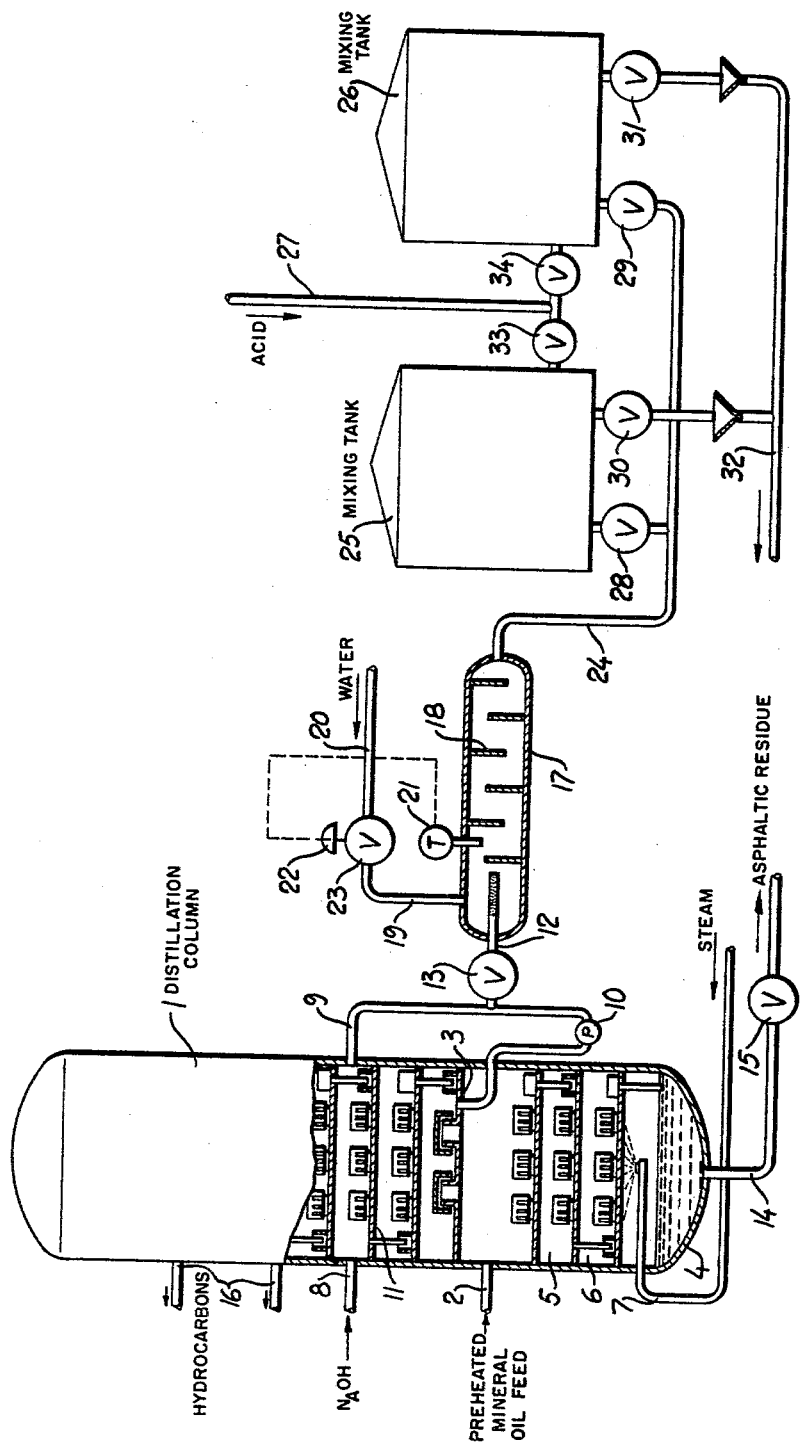

3,196,103
DISTILLATION OF NAPHTHENIC ACID-CONTAINING MINERAL OILS
Gunnar Lennart Fredenmark and Sten Gösta Fransson, Nynashamn, Sweden, assignors to AB Nynas-Petroleum, Stockholm, Sweden, a corporation of Sweden
Filed Nov. 30, 1961, Ser. No. 156,061
Claims priority, application Sweden, Dec. 2, 1960, 11,691/60
3 Claims. (Cl. 208—263)

The present invention is concerned with the distillation of naphthenic acid-containing mineral oils. More particularly it relates to the treatment of the heavy hot mineral oil fraction, obtained in a mineral oil distillation, which is discharged from the lower part of a distillation column used for this purpose.

It is known to subject mineral oils containing naphthenic acids and asphalt to a distillation process in order to divide the mineral oil into fractions of different technical utility, and in order to separate the mineral oil hydrocarbons from the asphalt.

For this purpose it is common practice to use a distillation column, into which the mineral oil to be treated is introduced after preheating. The introduction of the preheated oil is effected into a space dividing the distillation column into two parts, namely, an upper concentration part and a lower driving-off part. On introducing the oil into this space a partial evaporation of it will occur. The vapors formed will accordingly ascend into the concentration part of the column, and the remaining liquid portion of the oil descend through the column while being successively freed from lighter mineral oil hydrocarbons. The strongly asphalt-containing residue will collect in the bottom of the column, from where it can be discharged. In the concentration part of the column the ascending vapors will meet a reflux of liquid hydrocarbons. Acording to the reflux ratio used, more or less sharply fractionated mixtures of hydrocarbons will collect on different plates of the concentration part of the column, which they are discharged for further treatment from, which may, e.g., be another distillation in a so-called stripper.

What ever subsequent treatment the fractions obtained in the distillation are to undergo, it is in most cases highly desirable and sometimes quite necessary to remove the naphthenic acids present in the mineral oil even in the distillation process. For this purpose it is common practice to introduce an alkaline substance into the concentration part of the distillation column, and this substance is caused to descend in the column while reacting with the rising vapours of naphthenic acids to neutralize them. A requirement of the distillation process is that alkali and/or alkali naphthenates should not be commingled with the asphalt, which would otherwise be completely destroyed. For this purpose it is also practiced to operate a distillation column for distilling asphalt- and naphthenic acid-containing mineral oils with the lower plate of the concentration part tight to prevent alkali hydroxide and alkali naphthenates to flow down into the driving-off part of the column. The result of this will be that a heavy mineral oil fraction which contains the alkali naphthenates formed in the neutralization process and the alkali remaining after this process (alkali is always introduced into the concentration part of the column in an excess over what is, in theory, required to neutralize the naphthenic acids) in dispersed form, collects on the tight plate.

The present invention is particularly concerned with the problem of handling this mineral oil fraction after discharging it from the tight plate of the column. If the mineral oil should be cooled by using heat transferring walls, great handling problems would result due to the high viscous character of the fraction at lower temperatures and also due to the presence of the dispersed substances which latter tend to adhere to the surfaces of the heat transferring walls with the result that the heat transfer will be affected. In order to be able to use the mineral oil commercially, it is necessary to remove the alkali, as well as the alkali compounds, completely, and this involves a troublesome treatment of the cooled high viscous mineral oil fraction with water.

The usual method to cool the mineral oil fraction is to mix it, immediately on discharging it from the distillation column, with a so-called cooling oil, the purpose of which being also to lower the viscosity of the resulting oil. In this connection it has proved that certain resinous substances will precipitate in the oil, so that the mixed oil obtained will be especially difficult to handle during the subsequent treatment due to the formation with water of emulsions which are very difficult to break. Moreover, the process is expensive, since as a rule the cooling oil must be recovered to recirculate it within the process.

The purpose of the present invention is to provide an improved process for handling the hot mineral oil fraction, containing alkali and alkali naphthenates dispersed therein, discharged from the tight plate above referred to to produce a product free from alkali which can be utilized commercially.

According to the invention it has been found that the cooling of the mineral oil fraction contemplated can be carried out in a more satisfactory way, if the suspension of alkali and alkali naphthenates is not cooled by using heat transferring walls or directly by a cooling oil, but is chilled with water to dissolve the naphthenates and the alkali. A relatively stable emulsion of the mineral oil fraction with water is thereby formed using these naphthenates as the emulsifying agent for the oil. In this connection it has surprisingly proved that the resinous substances will remain in solution, which means that the handling problem which would arise from their precipitation in the oil is eliminated.

On the basis of the preceding discussion the present invention relates to a process in the fractional distillation of naphthenic acid- and asphalt-containing mineral oils in a distillation column, in which the naphthenic acids are contacted with an alkali metal compound in excess of that required stoichiometrically for the conversion of the naphthenic acids into corresponding alkali metal salts, a hot suspension or dispersion of the alkali metal naphthenates and remaining alkali metal compound in a heavy mineral oil fraction is discharged from a tight plate in the lower part of the concentration part of the column, and asphalt is discharged from the bottom of the driving-off part of the column.

According to the invention this process is characterized by this that the hot suspension or dispersion is chilled with water to form an aqueous emulsion of the heavy mineral oil fraction, to the aqueous emulsion is separately added a mineral acid in a sufficient amount to break the emulsion, and the heavy mineral oil fraction thus separated from the alkali metal salt-containing aqueous phase is recovered.

The aqueous emulsion obtained is of low-viscosity and can be passed to a tank or other suitable container, in which an acid is added in a sufficient quantity to neutralize the remaining alkali and to decompose the alkali naphthenates.

Moreover, it has also surprisingly been found that, on the one hand, the emulsion will immediately be broken on adding the acid thereto to form a very readily separable oil phase, and, on the other hand, that the mineral oil formed on breaking the emulsion and separating the aqueous phase can be diluted with a thinner oil without any more considerable amounts of resinous substances precipitating.

The invention also relates to an apparatus for carrying out the process set forth above. Such an apparatus comprises an elongated container which has provided internally therein partitions arranged alternatingly in the ceiling and on the floor thereof in a manner to form a zig-zagged flow path through the container which latter is in addition thereto connected to the column used of the distillation process.

In the process above referred to consisting in chilling a hot oil, which usually has a temperature exceeding 300° C., it is in view of the risks encountered herein, of great importance that the contact between the oil and the water should be effected in a correct way, and the invention also relates to an apparatus for carrying out the process of the invention in a manner completely to eliminate these risks.

The principle is that the oil is introduced into the aqueous phase in a finely dispersed form, using suitable means to secure a strong turbulence within the zone of mixing in order to avoid any formation of a continuous oil phase. The presence of such a continuous phase would, of course, involve the risk that water might evaporate spontaneously to cause a strong increase of pressure in the container.

According to the invention the container is therefore preferably provided with suitable means to disperse the oil into the cooling water. Such a means may be a perforated tube or similar. Preferably the intake for cooling water is arranged vertically above the dispersing zone of the oil in order to secure that the turbulence attained as a result of the dispersing process should be sufficient to form the emulsion contemplated.

The invention will now be described with reference to the accompanying drawing which represents a schematic view of the different units used in a preferred embodiment of the process according to invention.

On the drawing there is shown a distillation column 1 for the distillation of mineral oils in vacuum. In this column preheated mineral oil is introduced through an inlet 2 arranged below a so-called tight plate 3. The driving-off part of the column is designed with the reference number 4. The oil introduced into the column is partially evaporated, and the vapors formed rise upwardly through the column while the remaining not evaporated portion descends through the column over the intermediate plates 5 and 6, respectively, where another portion of the mineral oil is driven off by supplying steam into the lower part of the column via the duct 7 and the dispersing means arranged at the end thereof. To attain the reflux necessary to achieve a fractionation in the column a cooler may be arranged on the top thereof or a recirculation of cooled liquid may also be arranged. An aqueous solution of sodium hydroxide is introduced into the upper part of the column over the inlet 8, and while flowing downwardly in the column the solution will extract the naphthenic acids in vapour form rising upwardly. The sodium naphthenates formed and the excess of sodium hydroxide will form a suspension in the oil, and this suspension, which also contains resinous substances, will collect on the plate 3, since the latter is tight, that is, no flowing of liquid to the underlying plate can take place. A duct 9 for the recirculation of liquid within the column having a pump 10 inserted therein extends to a higher lying plate 11. To this duct for recirculating liquid is connected an outlet duct 12 having a valve 13 to discharge the suspension of sodium naphthenate and sodium hydroxide from the column. The residue mainly consisting of asphalt collected in the lowest part 4 of the column is discharged through another outlet duct 14 having a control valve 15 inserted therein. The purpose of the recirculation duct 9 is to make possible a recirculation of oil within that zone of the column in which the reaction of the naphthenic acids and the alkaline substance mainly takes place in order to attain a more effective contact between the reaction components and accordingly a complete removal of the naphthenic acids from the rising vapours of hydrocarbons. Fractions of hydrocarbons are discharged from the column at the top of it and via the outlets 16.

The heavy mineral fraction, containing resinous substances, discharged from the plate 3 of the column which has a temperature exceeding 300° C. is transported through duct 12 to the elongated container 17. The end portion of the duct 12 is inserted into one of the ends of this container and is also perforated along that part which is within the container to divide the hot oil passing out into a plurality of rapid streams directed at right angles to the duct.

The elongated container 17 has its internal wall surface provided with partitions 18 arranged alternatingly in the ceiling and on the floor thereof, and these partitions are arranged to form a zig-zagged flow path in the passing of which the flowing medium is subjected to a plurality of rapid changes of direction. Vertically above the perforated end of the duct 12 there is arranged an intake 19 for water, and the water is supplied into the container 17 through a duct 20 having a valve inserted therein in a manner to secure that it should rapidly be contacted with the oil divided into a plurality of smaller and rapid streams to attain an effective mixing and emulsification.

By the arrangement of the water supply in this manner further tendencies towards a separation of continuous hot oil phases are counteracted in that due to the specific gravity the cold water introduced into the container is forced to flow downwardly thereby to effect a contact with the hot oil introduced. The temperature of the container is controlled by a thermometer 21 capable of giving impulses to a control device 22 to regulate the water flow of the valve 23 of the duct 20 in a manner to effect a chilling to the desired temperature of the aqueous emulsion formed. This temperature is between 65 and 95° C., preferably between 80 and 90° C. (at atmospheric pressure). The aqueous emulsion is then passed through the duct 24 to any of the mixing tanks 25 and 26, in which a mineral acid (sulfuric acid) is added through the duct 27. In this process the excess of sodium hydroxide of the emulsion will be neutralized, and the sodium naphthenates serving as an emulsifier decomposed. Under operation conditions the tanks are operated discontinuously, and to control the supply of aqueous emulsion thereinto there are used the two valves 28 and 29, respectively, in addition to which the valves 30 and 31, respectively, are used to evacuate the tanks via the outlet duct 32. The addition of acid is controlled by the valves 33 and 34, respectively.

On adding the mineral acid to the emulsion the latter will be broken, and the aqueous phase separated can be readily separated from the oil phase, which can in turn be diluted with another oil to a suitable viscosity. It has proved that under practical conditions the amount of water supplied, the addition of alkali and concentration of mineral acid can be easily adjusted to obtain an aqueous phase having a high content of salt and accordingly a high specific gravity. Under these conditions an oil fraction which is highly viscous at usual temperatures can also be caused to separate very rapidly from the heavy aqueous phase at the temperature of 80–90° set forth above.

As an illustration of the type of operation shown in the figure, a mixture consisting of 72 percent by volume of lube distillate from Venezuelan and 28 percent by volume of topped Venezuelan crude was distilled at a pressure of 30 mm. mercury. Commercial aqueous 43 percent sodium hydroxide was injected into the vacuum column 1 via the inlet 8. The following fractions were obtained:

Overhead distillate, 27.5% with viscosity 20 centistoke at 20° C.

Lube cut No. 1, 11.4% with viscosity 20 centistoke at 50° C.
Lube cut No. 2, 32.2% with viscosity 65 centistoke at 50° C.
Lube cut No. 3, 14.9% with viscosity 220 centistoke at 50° C.
Asphalt, 9.2% with softening point 50° C. (ring and ball method).

From plate 3 of the vacuum column 1 was discharged a mixture of heavy oil, sodium naphthenates and remaining sodium hydroxide. This mixture was chilled with water and then treated with sulfuric acid, an oil readily separating from the aqueous phase. The heavy oil recovered amounted to 4 percent by volume, based on the feed to the column. This oil had a specific gravity of 0.96 and a softening point of 13° C. R. and B. It was pumped to a storage tank and mixed with heavy gas oil in order to meet the Swedish specification of fuel oil.

The mixed oil had the following analysis:

Specific gravity _____ 0.93 at 15° C.
Viscosity _____ 30 centistoke at 50° C.
Water content _____ 0.3 percent.
Sodium content _____ 160 p.p.m.

What we claim is:
1. In a method for the fractionation of a mineral oil feedstock containing naphthenic acids and asphalt substances which comprises: separating the feedstock into a lighter naphthenic acid fraction and a heavier asphaltic fraction, converting the naphthenic acid fraction into its corresponding alkali metal salts by the addition thereto of an alkali metal hydroxide in an amount in excess of that which is required stoichiometrically to convert said acids, forming a suspension of alkali metal naphthenates, unreacted alkali metal hydroxide and a heavy mineral oil fraction, admixing a cooling medium with said suspension to cool said suspension, forming an emulsion of said suspension, adding mineral acid to said emulsion in an amount sufficient to convert the alkali metal compounds therein into the corresponding alkali metal salts of said mineral acid and to cause the emulsion to break, and recovering separately a heavy mineral oil fraction and an alkali metal salt-containing phase, the improvement wherein cooling of the suspension and formation of the emulsion are accomplished simultaneously and solely by the admixing of a sufficient amount of water to the suspension to lower the temperature of the suspension from above about 300° C. to about 65–95° C.

2. A method according to claim 1 wherein the temperature is lowered from above about 300° C. to about 80–90° C.

3. A method according to claim 1 wherein the admixing of said water and said suspension is accomplished by causing said suspension to move in a generally tortuous zig-zag path and said water which is introduced to cool and emulsify said suspension falls by gravity into and through said suspension to thereby form a stable emulsion.

References Cited by the Examiner

UNITED STATES PATENTS

| | | | |
|---|---|---|---|
| 1,686,491 | 10/28 | Hughes et al. | 208—263 |
| 1,785,242 | 12/30 | Becker et al. | 208—263 |
| 1,802,336 | 4/31 | Cook | 208—263 |
| 1,938,513 | 12/33 | Brunck et al. | 208—263 |
| 2,559,129 | 7/51 | Miller | 202—46 |
| 2,789,081 | 4/57 | Mills | 208—263 |

DELBERT E. GANTZ, *Primary Examiner.*

ALPHONSO D. SULLIVAN, *Examiner.*